No. 749,755. PATENTED JAN. 19, 1904.
L. Y. SPEAR.
ALTISCOPE OR THE LIKE.
APPLICATION FILED MAR. 14, 1903.
NO MODEL.
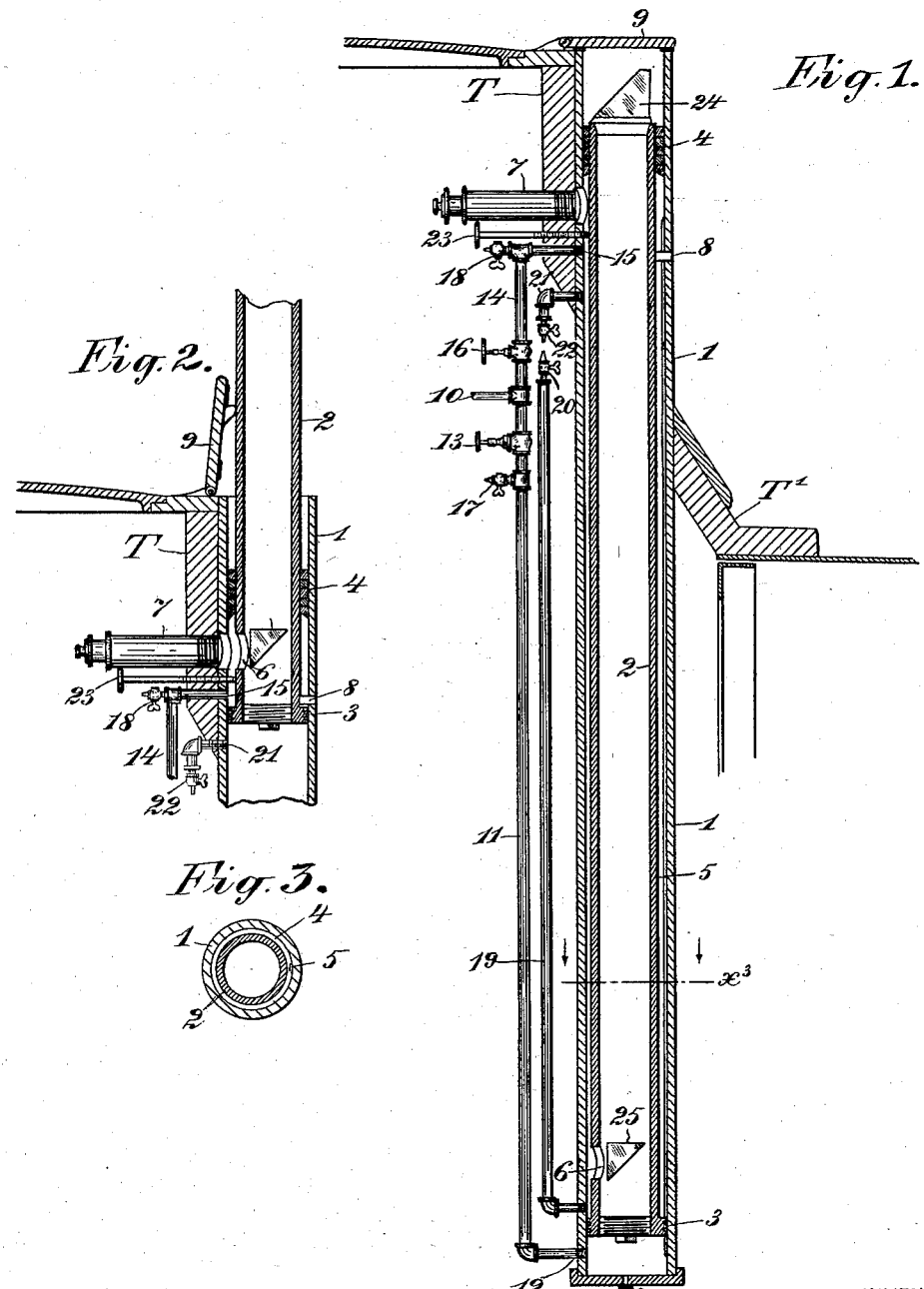
WITNESSES:
INVENTOR
Lawrence Y. Spear
BY
ATTORNEY No. 749,755. Patented January 19, 1904.

UNITED STATES PATENT OFFICE.

LAWRENCE Y. SPEAR, OF GREENPORT, NEW YORK, ASSIGNOR TO ELECTRIC BOAT COMPANY, A CORPORATION OF NEW JERSEY.

ALTISCOPE OR THE LIKE.

SPECIFICATION forming part of Letters Patent No. 749,755, dated January 19, 1904.

Application filed March 14, 1903. Serial No. 147,736. (No model.)

*To all whom it may concern:*

Be it known that I, LAWRENCE Y. SPEAR, a citizen of the United States, residing in Greenport, in the county of Suffolk and State of New York, have invented certain new and useful Improvements in Altiscopes or the Like, of which the following is a specification.

This invention relates to the class of optical devices known as "altiscopes" and "periscopes." Such device, connected with the conning-tower, turret, or sighting-hood of a submarine or mainly-submerged vessel, is designed to enable the steersman or observer in the vessel, and whose head is below or near the level of the water of flotation, to observe surrounding objects from a point considerably above the level of the water.

The object of the present invention is to improve the mountings and construction of the instrument, as will be hereinafter explained.

In the accompanying drawings an embodiment of the invention is illustrated.

Figure 1 is a vertical axial section of the instrument and a part of the turret of the vessel. Fig. 2 is a section similar to Fig. 1, but showing the optical tube protruded. Fig. 3 is a cross-section at $x^3$ in Fig. 1.

T designates a part of the turret or conning-tower of a vessel or submarine boat, and T' shows the flared base of the same.

At the side of the tower T, and preferably disposed in a vertical plane passing through the boat's longitudinal axis forward, is secured to the tower an upright sheath 1 to receive the optical tube 2. The sheath may extend down into the boat, as shown in Fig. 1, and the optical tube 2 is mounted telescopically therein, so that it may be housed in the sheath, as seen in Fig. 1, or protruded upward out of the sheath, as indicated in Fig. 2.

The optical tube 2 has on its lower closed end a piston 3, which fits snugly in the sheath, and near the upper end of the sheath the tube plays through a packing-ring 4 in the sheath. To prevent the tube from rotating axially, there is a rib or feather 5 in the sheath which engages a recess or keyway in the piston 3. This insures that an aperture 6 in the side of the optical tube shall be brought to register with a telescope 7 when the tube is protruded, as in Fig. 2, and the piston 3 is brought up to a bearing against a limiting-stop 8, set in the sheath. The top of the sheath is closed by any suitable cover 9, that shown being hinged to the turret. The telescope 7 is mounted in the wall of the turret.

The optical tube 2 is protruded by admitting a fluid under pressure, as compressed air, beneath the tube through a supply-pipe 10, which connects with a pipe 11, that taps the sheath below at 12. This pipe 11 has in it a controlling stop-valve 13. The supply-pipe connects also with a pipe 14, which taps the sheath above at 15, and has in it a controlling stop-valve 16. The respective pipes 11 and 14 may also have cocks 17 and 18.

19 is an exhaust-pipe which taps the sheath below and has a cock 20 to open it to the atmosphere, and 21 is a similar pipe which taps the sheath above and has in it a cock 22.

The operation is as follows: When it is desired to protrude the optical tube 2, the fluid under pressure is admitted to the lower part of the sheath through the pipe 11 and the exhaust-cock 22 opened. The fluid forces the optical tube upward, and when the piston shall have passed the outlet to pipe 21 the cock 22 is closed. This leaves a cushion of air between the piston and the packing 4, and this cushion may be gradually exhausted by opening the cock 18, so as to allow the piston to come up gradually to its seat at 8. When the tube shall have been fully protruded, it may be held in place by a set-screw 23.

The optical tube may be housed by loosening the screw 23, opening the cock 20, and opening the stop-valve 16.

Obviously the details of construction may be varied without departing from the invention in any material degree.

The optical tube 2 will be fitted, as usual, with prisms 24 and 25 to receive and deflect the image to the eye of the observer at telescope 7. Any form of mirror or deflecting means may be employed for this purpose, the present invention not being limited in this respect. Obviously, also, the instrument 7, which I have called a "telescope," may be of any known and suitable construction.

In the bottom of the sheath is a drainage-cock 26.

Having thus described my invention, I claim—

1. The combination with a boat and its turret, of a sheath fixed in an upright position to said turret, a single optical tube mounted slidably in said sheath and provided near its lower end with an aperture 6 in its side and a prism opposite thereto, a telescope mounted in an aperture extending through the turret-wall and the wall of said sheath, and means for elevating said optical tube until its aperture 6 is opposite to said telescope.

2. An altiscope for submarine and other boats, having a single optical tube mounted slidably in a fixed, upright inclosing sheath, said sheath having a packing at its upper part to embrace the optical tube and a cap to close its upper end, and said tube having a piston at its closed lower end, means for admitting to the sheath a fluid under pressure for operating the tube, and means for cushioning the movement of said tube.

3. The combination with a boat and its turret, of a sheath fixed in an upright position to said turret and provided with a packing 4, an optical tube mounted slidably in said sheath and provided with a piston 3, and an aperture 6, a telescope mounted in the wall of the turret, means for admitting a fluid under pressure to the sheath for operating the optical tube and for regulating said fluid, means for preventing the axial rotation of the tube in its sheath, and means for securing the tube in its protruded position.

In witness whereof I have hereunto signed my name, this 11th day of March, 1903, in the presence of two subscribing-witnesses.

LAWRENCE Y. SPEAR.

Witnesses:
F. L. BRAKE,
W. R. SANDS.